(12) United States Patent
Huang et al.

(10) Patent No.: US 8,406,336 B2
(45) Date of Patent: Mar. 26, 2013

(54) COMMUNICATION DEVICE AND RECEIVING METHOD THEREOF

(75) Inventors: Liang-wei Huang, Hsinchu (TW);
Ting-Fa Yu, Yunlin County (TW);
Ta-Chin Tseng, Taipei County (TW);
Li-Wei Fang, Taichung County (TW)

(73) Assignee: Realtek Semiconductor Corp., HsinChu (TW)

( * ) Notice: Subject to any disclaimer, the term of this patent is extended or adjusted under 35 U.S.C. 154(b) by 342 days.

(21) Appl. No.: 12/879,919

(22) Filed: Sep. 10, 2010

(65) Prior Publication Data
US 2011/0064174 A1 Mar. 17, 2011

(30) Foreign Application Priority Data
Sep. 11, 2009 (TW) .............................. 98130818 A

(51) Int. Cl.
*H04B 15/00* (2006.01)
(52) U.S. Cl. .... 375/285; 370/286; 375/346; 379/406.01
(58) Field of Classification Search .................. 375/285, 375/350, 229, 346, 348; 370/286, 290, 291; 379/406.01, 406.08
See application file for complete search history.

(56) References Cited

U.S. PATENT DOCUMENTS

| | | | |
|---|---|---|---|
| 6,765,967 B2 * | 7/2004 | Dowling | 375/254 |
| 7,002,897 B2 | 2/2006 | Jones et al. | |
| 2004/0136453 A1 * | 7/2004 | Lin et al. | 375/232 |
| 2008/0253489 A1 | 10/2008 | Huang | |
| 2009/0225912 A1 | 9/2009 | Shih et al. | |

* cited by examiner

*Primary Examiner* — Jean B Corrielus
(74) *Attorney, Agent, or Firm* — Muncy, Geissler, Olds & Lowe, PLLC

(57) ABSTRACT

A communication device and receiving method thereof are disclosed in embodiments of the present invention. The communication device includes an extra digital to analog converter, an inverse partial response filtering circuit and an analog to digital converter. The extra digital to analog converter receives a first digital signal and generates a pulse shaped analog signal. The inverse partial response filtering circuit receives a first difference signal, and adjusts a response of the inverse partial response filtering circuit to generate an adjusted signal, wherein the first difference signal equals the result of subtracting the pulse shaped analog signal from a receiving signal. The analog to digital converter converts the adjusted signal to generate a second digital signal.

20 Claims, 8 Drawing Sheets

COMMUNICATION DEVICE AND RECEIVING METHOD THEREOF

BACKGROUND OF THE INVENTION (a) Field of the Invention

The invention relates to a communication device, particularly to a communication device that is capable of eliminating near-end cross talk and dynamically adjusting the high-frequency response.

(b) Description of the Related Art

FIG. 1 shows a schematic diagram illustrating a communication device in the prior art. The communication device 10 comprises a transmitting medium 11, a hybrid circuit 12, a local transmitting circuit Tx, and a local receiving circuit Rx. The communication device 10 can perform signal transmission and reception with a far-end communication device via the transmitting medium 11. Generally, the local transmitting circuit Tx comprises a digital to analog (DA) converter (not shown) for converting a signal into an analog signal to generate a transmission signal STX that is then outputted through the hybrid circuit 12 and the transmitting medium 11. The local receiving circuit Rx comprises an analog to digital (AD) converter for performing analog to digital conversion on the receiving signal SRX inputted via the hybrid circuit 12 and the transmitting medium 11.

Since signal transmission and reception of the communication device 10 usually occur at the same time, while the local receiving circuit Rx of the communication device 10 receives the signal SRX from the far-end communication device, the local receiving circuit Rx is interfered by the echo bounced back from the far-end communication device after the local transmitting circuit Tx of the communication device 10 transmits a signal and also interfered by near-end cross talk (NEXT) to result in lowering communication quality of the communication system.

Furthermore, the power of the signal SRX received by the local receiving circuit Rx of the communication device 10 is reduced due to transmission distance and the local receiving circuit 13 also simultaneously receives echo and crosstalk signals (high-frequency noise), the power of which is much larger than the signal SRX.

In order to correspondingly process the effect generated by the partial response filter (not shown) in the far-end transmitting circuit, generally the local receiving circuit Rx is provided with a high pass filter (HPF) (not shown) for having the high frequency component pass, such as inverse partial response filter (IPR) (not shown). Since there are many near-end interferences and the signal passing through the inverse partial response filter has its high-frequency component boosted or increased, the signal peak-to-average ratio of the near-end interference (such as echo and crosstalk interferences) is increased and relatively the signal peak-to-average ratio of the whole including the far end and the near end is also increased, that is, the peak value of the signal is increased.

In order to completely receive and process the signal having an increased peak value, the dynamic range of the analog to digital (AD) converter of the local receiving circuit Rx should be designed to be large. Thus, the design of the communication device becomes complicate to result in increasing production cost. But, reducing the cost of the analog to digital (AD) converter will result in limiting the effect of the inverse partial response filter.

BRIEF SUMMARY OF THE INVENTION

One object of the invention is to provide a communication device to dynamically adjust the high-frequency response.

One embodiment of the invention provides a communication device, comprising: a digital to analog converter, an inverse partial response filtering circuit, and an analog to digital converter. The digital to analog converter receives a first digital signal and converts the first digital signal into a pulse-shaped analog signal according to a plurality of voltage level and voltage intensity thereof. The inverse partial response filtering circuit receives a difference signal, which is the result of subtracting the pulse-shaped analog signal from a receiving signal, and adjusts a response of the inverse partial response filtering circuit according to the channel state of the receiving signal to generate an adjusted signal. The analog to digital converter receives the adjusted signal and converts the adjusted signal to generate a second digital signal. The pulse-shaped analog signal is related to the echo and crosstalk noise components in the receiving signal.

One embodiment of the invention provides a receiving method, having echo and crosstalk eliminated, comprising the following steps. At first, a plurality of voltage levels and voltage intensity thereof are determined according to an estimating signal. A first digital signal is generated according to the plurality of voltage levels and the estimating signal. The first digital signal is converted into a pulse-shaped analog signal according to the plurality of voltage levels and voltage intensity thereof. Then, a receiving signal is received and a difference signal is generated by subtracting the pulse-shaped analog signal from the receiving signal. The peak-to-average ratio of the difference signal is adjusted according to the channel state of the receiving signal. The difference signal is converted into a second digital signal. Finally, the estimating signal is generated according to an output interference response of the analog to digital (AD) converter and the second digital signal, wherein the output interference response is the same as a input interference response.

The communication device and method according to the embodiments of the invention set the voltage levels of the signals according to the state of the receiving signal in the channel to appropriately eliminate the echo and crosstalk components in the receiving signal. In addition, according to the channel state of the receiving signal, the communication device according to the embodiments of the invention appropriately adjusts a response of the inverse partial response filtering circuit (such as the peak-to-average ratio while a signal enters an analog to digital (AD) converter) to reduce the effect of quantization noise and increase the signal to noise ratio (SNR) so that the subsequent signal processing can be converged to an optimum condition to increase the performance and stability of the communication device.

DETAILED DESCRIPTION OF THE INVENTION

The communication device according to the embodiments of the invention will be described in details with reference to the drawings.

Figure 1:
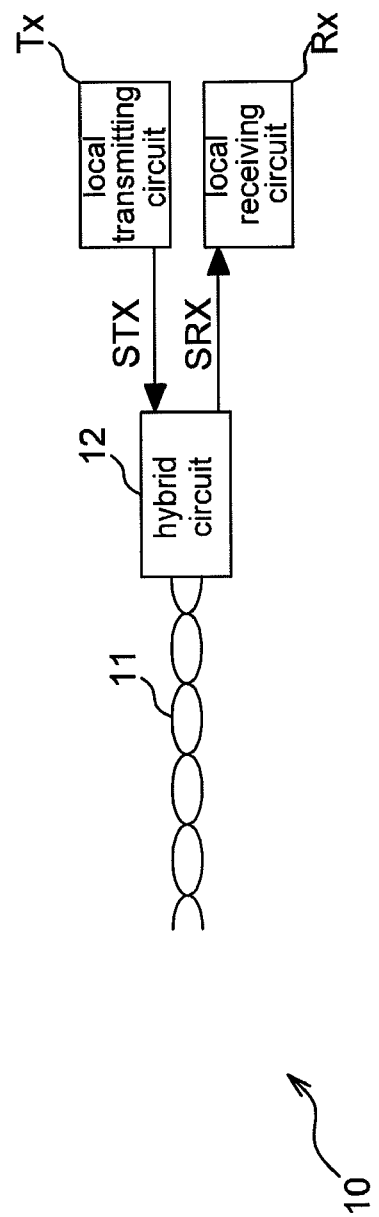
FIG. 1 shows a schematic diagram illustrating a communication device according to the prior art.
Figure 2A:
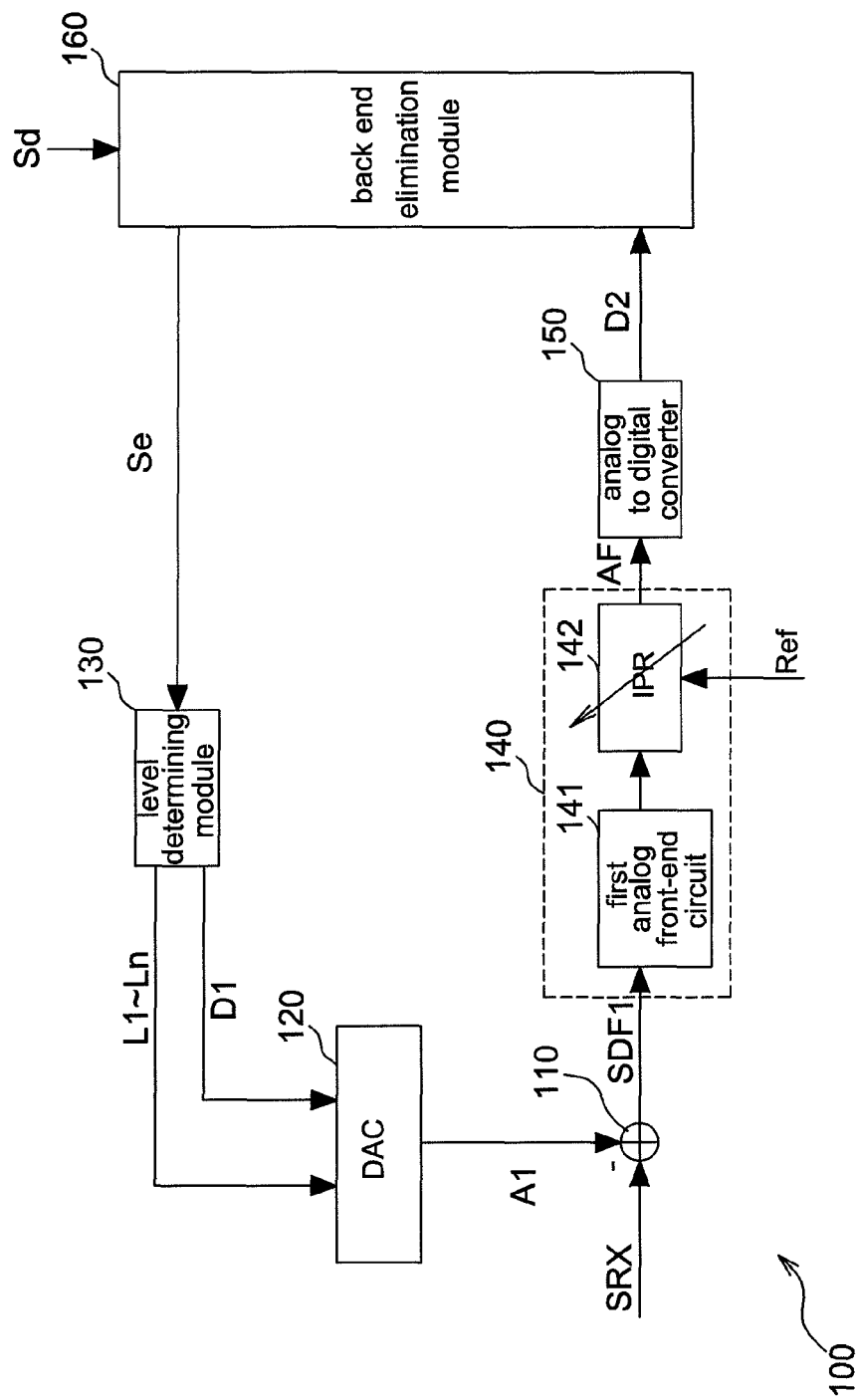
FIG. 2A shows a schematic diagram illustrating a communication device according to one embodiment of the invention.

FIG. 2A shows a schematic diagram illustrating a communication device according to one embodiment of the invention. The communication device 100 is applicable to the receiving circuit Rx shown in FIG. 1. The communication device 100 comprises a calculator 110, an extra digital to analog converter (Extra DAC) 120, a level determining module 130, an analog front-end circuit 140, an analog to digital converter (ADC) 150, and a back end elimination module 160.

The communication device 100 receives a receiving signal SRX. In one embodiment, the receiving signal SRX can comprise a signal transmitted from a far-end communication device and the noise components like echo and crosstalk (NEXT) mixing with the signal.

The calculator 110 is used to subtract a pulse-shaped analog signal A1 from the receiving signal SRX to generate a difference signal SDF1. In one embodiment, the calculator 110 is a subtractor.

The analog front-end circuit 140 is used to process the difference signal SDF1 outputted by the calculator 110. In one embodiment, the analog front-end circuit 140 comprises a first analog front-end circuit 141 and an adjustable inverse partial response filter (IPR) 142. The first analog front-end circuit 141 is used to perform a signal scaling up/down or filtering process on the difference signal SDF1 or perform the combination of the two processes. The adjustable inverse partial response filter (IPR) 142 is used to correspondingly adjust the response of the inverse partial response filter according to the state of the receiving signal SRX and to further change the peak-to-average ratio of the difference signal SDF1 to generate a processed signal AF. For example, the adjustable inverse partial response filter (IPR) 142 receives a related reference signal Ref comprising the information of the state of the receiving signal SRX to execute the adjusting operation of the response. The state comprises channel state, signal quality, a signal peak-to-average ratio, a signal channel length, and channel physical route quality, or the combination of the above. In one embodiment, the inverse partial response filter (IPR) 142 can be an unlimited pulse response filter.

The digital to analog converter (DAC) 120 couples to the calculator 110 and receives a first digital signal D1. According to the voltage levels L1~Ln and the corresponding voltage intensity of the voltage levels L1~Ln, the digital to analog converter (DAC) 120 converts the first digital signal D1 into a pulse-shaped analog signal A1. It should be noted that the digital to analog converter (DAC) 120 has various preset functions. The preset function means a variety of different functions, such as continuously or intermittently providing a target voltage level or a signal with a different voltage level within a preset period of time or the sampling method or signal output method that can be adjusted by a designer.

The level determining module 130 couples to the digital to analog converter (DAC) 120 and is to receive an estimating signal Se and determine the voltage levels L1~Ln and the corresponding voltage intensity of the voltage levels L1~Ln according to the estimating signal Se to generate the first digital signal D1. In the above, the number "n" can be an odd number such as 3, 5, 7, 11, 13, 15, etc.; or n can be a power of two, such as 2, 4, 8, 16 . . . . Obviously, these numbers are only examples but the invention is not limited to these examples. The number "n" can be adjusted according to the needs of a designer.

The analog to digital converter (ADC) 150 couples to the analog front-end circuit 140 and is to receive the processed signal AF processed by the analog front-end circuit 140 and convert the processed signal AF into a second digital signal D2.

The back end elimination module 160 is to estimate and eliminate the echo and crosstalk noise components in the receiving signal SRX. According to a desired signal Sd and the second digital signal D2, the back end elimination module 160 generates the above estimating signal Se. In one embodiment, the estimating signal Se is related to an estimated value of the echo and crosstalk noise components. It should be noted that those who are skilled in art should understand all possible implementations of the back end elimination module 160. Thus, its details will not be given hereinafter.

It should be noted that in one embodiment the pulse duration of the above mentioned pulse-shaped analog signal A1 is shorter than one sampling period of the analog to digital converter (ADC) 150. In another embodiment, the analog to digital converter (ADC) 150 has a conditional sampling equation on the pulse-shaped analog signal: $G(Pu, AFE) < 1T$, where G represents convolution, Pu represents the pulse, AFE represents input interference response before the analog to digital converter (ADC) 150, and 1T represents one time sampling duration. In another embodiment, the analog to digital converter (ADC) 150 samples the maximum amplitude of the pulse-shaped analog signal A1 at each time point. Obviously, the sampling principle of each embodiment can be implemented by each of the above description, part of the above description, or all of the above description.

Figure 2B:
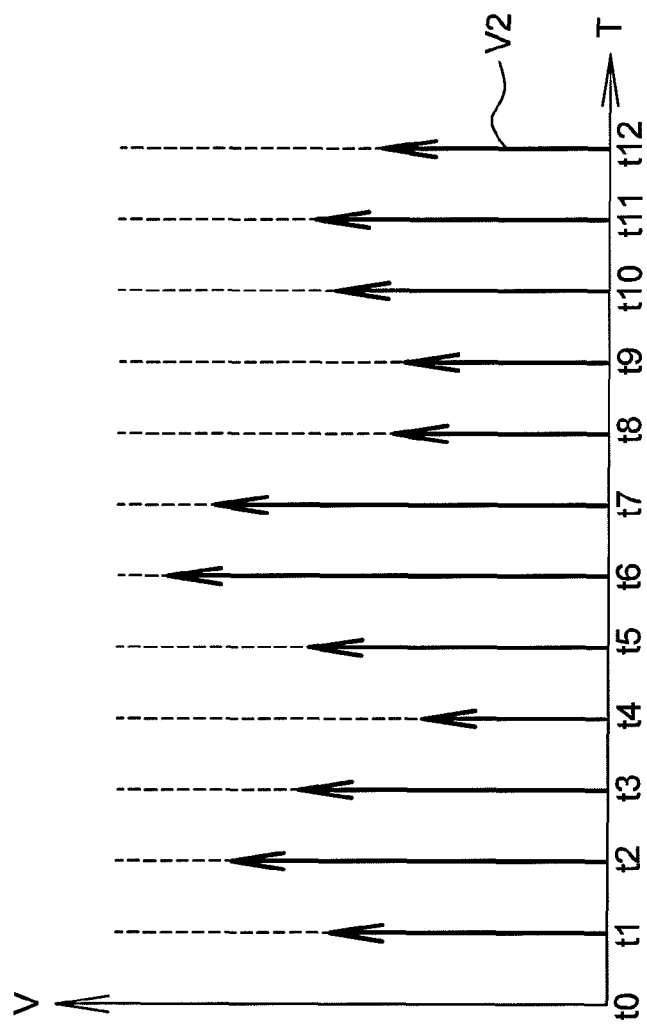
FIG. 2B shows an operating waveform diagram of the communication device shown in FIG. 2A.

Referring to FIG. 2A and FIG. 2B, the following will describe the operating method and principle of the communication device 100 according to the embodiment of the invention.

During operation, the communication device 100 receives the receiving signal SRX. According to the estimating signal Se, the level determining module 130 determines the number of the voltage levels L1~Ln and the corresponding voltage intensity to generate the first digital signal D1.

Then, according to the voltage levels L1~Ln and the corresponding voltage intensity, the digital to analog converter (DAC) 120 converts the first digital signal D1 into a pulse-shaped analog signal A1, as shown by the waveform V2 in FIG. 2B. After the calculator 110 subtracts the pulse-shaped analog signal A1 from the receiving signal SRX, the difference signal SDF1 is generated.

It should be noted that, before the difference signal SDF1 enters the analog front-end circuit 140, the majority of high-frequency noise interferences in the signal can be eliminated beforehand. The details will be given in the following.

Simultaneously referring to FIGS. 2A and 2B, the communication device 100 according to the embodiment of the invention utilizes the digital to analog converter (DAC) 120 to output the pulse-shaped waveform. As the digital to analog converter (DAC) 120 outputs the pulse-shaped waveform V2, the signal format that can be sampled by a digital process is the format in Z-domain (for example, a superset of the frequency domain). In addition, during the digital process, the pulse-shaped waveform can be converted into the format in Z-domain. Thus, the pulse-shaped waveform can be processed by digital circuits. By this method, in the digital domain the communication device 100 can sample the input interference response of the analog front-end circuit 140 that is the same as the output interference response of the analog to digital converter (ADC) 150. While the communication device 100 according to the embodiment of the invention is in operation, N most significant bits (MSB) of the output interference response (including the echo and crosstalk noise components) of the analog to digital converter (ADC) 150 are processed by the back end elimination module 160 and the level determining module 130. The digital to analog converter (DAC) 120 converts the most significant bits of the noise from the digital signal D1 into the pulse-shaped analog signal A1. Therefore, by the subtraction of the calculator 110, the N most significant bits of the noise component can be eliminated during analog processing before the analog to digital converter (ADC) 150. The rest of the noise component in the output interference response (including the echo and crosstalk components) of the analog to digital converter (ADC) 150 can be eliminated during digital processing after the analog to digital converter (ADC) 150. For example, the rest of the noise component can be eliminated in the back end elimination module 160.

Therefore, most of the high-frequency noise interferences in the signal can be eliminated before the signal enters the analog front-end device 140.

Then, the operation of the above communication device 100 will be illustrated.

The analog front-end device 140 receives the difference signal SDF1 that has most of the noise be eliminated. After the first analog front-end circuit 141 processes the difference signal SDF1 (scaling up/down and/or filtering process) and the adjustable inverse partial response filter (IPR) 142 adjusts the peak-to-average ratio of the difference signal SDF1 according to the preset parameter, the processed signal AF is thereby generated.

The analog to digital converter (ADC) 150 receives the processed signal AF and converts the processed signal AF into the second digital signal D2. The back end elimination module 160 receives the second digital signal D2 and estimates the output interference response (i.e. echo and crosstalk existing in the receiving signal SRX in the current channel) of the analog to digital converter (ADC) 150 according to the second digital signal D2 to generate a new estimating signal Se. Following that, according to the new estimating signal Se, the level determining module 130 determines the voltage levels L1~Ln and the corresponding voltage intensity to generate a new first digital signal D1.

Again, according to the new first digital signal D1, the digital to analog converter (DAC) 120 generates a pulse-shaped analog signal A1. After the analog front-end circuit 140 processes the difference signal SDF1 that is the result of subtracting the analog signal A1 from the receiving signal SRX, the adjustable inverse partial response filter (IPR) 142 adjusts the peak-to-average ratio of the difference signal SDF1 according to the related reference signal Ref of the state information of the detected receiving signal SRX to generate the processed signal AF. The analog to digital converter (ADC) 150 generates a new digital signal D2 according to the processed signal AF.

Since the echo and crosstalk noise components estimated by the estimating signal are subtracted from the receiving signal SRX, the near-end interferences (echo and crosstalk components) have been appropriately subtracted before the signal enters the adjustable inverse partial response filter (IPR) 142. Thus, the high pass filter function of the inverse partial response filter (IPR) 142 will not increase the high frequency noises for the far end and the near end. Thus, the inverse partial response filter (IPR) 142 can accomplish its function and the partial response filter in the far-end transmitting circuit can perform the corresponding operation. For example, the transfer function of the far-end transmitting circuit is:

$$\frac{3}{4} + \frac{1}{4}Z^{-1}$$

while the transfer function of the inverse partial response filter (IPR) 142 is:

$$\frac{1}{\frac{3}{4} + \frac{1}{4}Z^{-1}}$$

to perform the corresponding operation.

By the above mentioned method, the back end circuit such as the back end elimination module 160 or an equalizer (not shown), a feed back equalizer (FBE) (not shown) can correspondingly perform the function of the far-end partial response filter to further increase the performance and communication quality of the communication device 100. Furthermore, since the inverse partial response filter (IPR) 142 adjusts the peak-to-average ratio according to the state of the receiving signal SRX, the peak-to-average ratio is adjusted to an optimum value so that the peak value of the signal will not be increased before the signal enters the analog to digital converter (ADC) 150. Therefore, the dynamic range of the analog to digital converter (ADC) 150 can be reduced and the number of bits of the analog to digital converter (ADC) 150 can be reduced so that the production cost can be reduced. Thus, the problem in the prior art can be solved and increasing the performance of the communication device can be achieved.

Each embodiment about how the communication device 100 according to the embodiments of the invention dynamically adjusts the high frequency response (peak-to-average ratio) of the inverse partial response filter (IPR) 142 according to the channel state of the receiving signal (such as the related reference signal Ref) will be described in the following.

Figure 3:
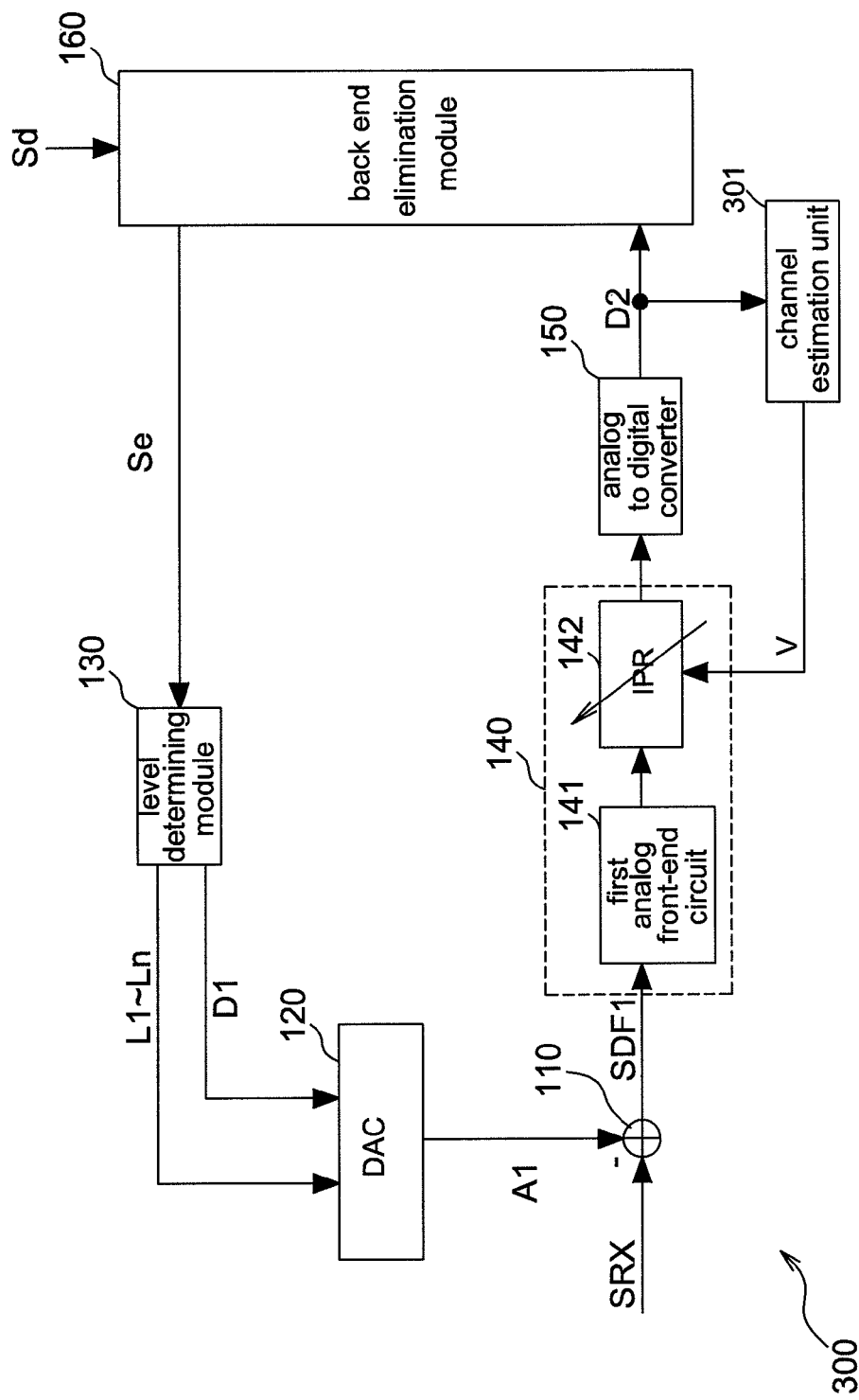
FIG. 3 shows a schematic diagram illustrating a communication device according to another embodiment of the invention.

FIG. 3 shows a schematic diagram illustrating a communication device 300 according to another embodiment of the invention. The operating method and the structure of the communication device 300 are similar to those of the communication device 100. The only difference is that the communication device 300 further comprises a channel estimation unit 301. While the communication device is turned on or in operation, the channel estimation unit 301 continuously or intermittently estimates the channel state of the receiving signal SRX according to the digital signal D2. For example, the estimating signal V is generated according to the length of signal channel or the quality of the channel physical route to dynamically adjust the peak-to-average ratio of the receiving signal SRX. For example, as the channel physical route of the receiving signal SRX estimated by the channel estimation unit 301 is longer than a predetermined value or a predetermined range, it indicates that the intensity of the receiving signal SRX is weaker and the decay in high frequency is increased. The channel estimation unit 301 generates an estimating signal V to increase the signal peak-to-average ratio of the inverse partial response filter (IPR) 142, for example increase to a preset target value, increase by a preset value or increase to a preset range so as to increase the high frequency component of the signal. Correspondingly, as the channel physical route of the receiving signal SRX estimated by the channel estimation unit 301 is shorter than a predetermined value or a predetermined range, it indicates that the intensity of the receiving signal SRX is stronger and the decay in high frequency is decreased. The channel estimation unit 301 generates an estimating signal V to decrease the signal peak-to-average ratio of the inverse partial response filter (IPR) 142, for example decrease to a preset target value, decrease by a preset value or decrease to a preset range so as to decrease the high frequency component of the signal.

Figure 4A:
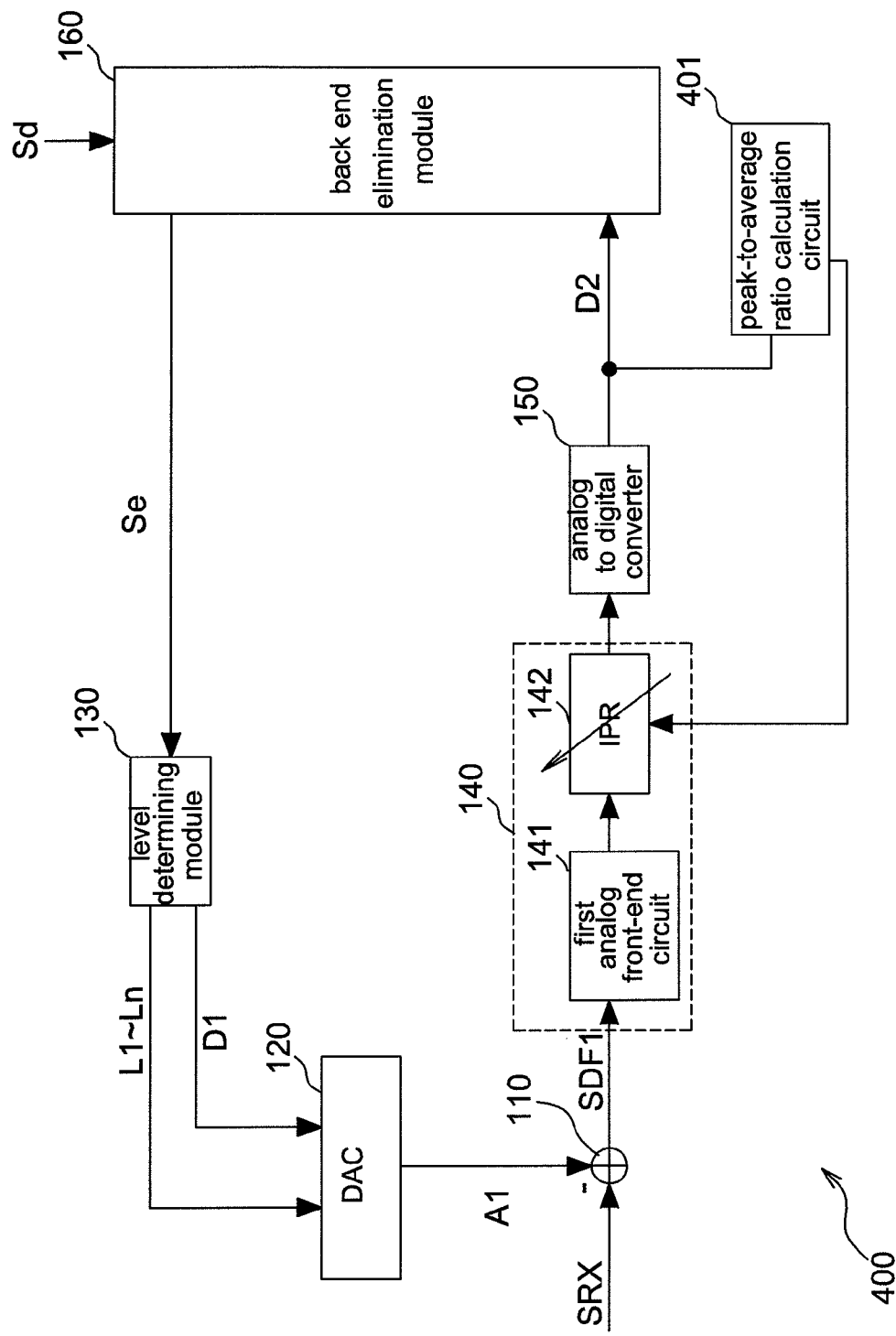
FIG. 4A shows a schematic diagram illustrating a communication device according to another embodiment of the invention.

FIG. 4A shows a schematic diagram illustrating a communication device 400 according to another embodiment of the invention. The operating method and the structure of the communication device 400 are similar to those of the communication device 100. The only difference is that the communication device 400 further comprises a signal peak-to-average ratio calculation circuit (PAR calculation circuit) 401. The signal peak-to-average ratio calculation circuit 401 can be used to receive the second digital signal D2 outputted by the analog to digital converter (ADC) 150 while the error of the estimation by the back end elimination module 160 or the channel estimation unit 301 occurs or under some special condition (for example, the physical route quality of the receiving signal SRX is very terrible to cause very large echo and/or crosstalk interferences). According to the second digital signal D2, the signal peak-to-average ratio calculation circuit 401 calculates the current receiving signal SRX, then calculates the signal peak-to-average ratio according to the receiving signal SRX, and finally adjusts the high frequency response of the inverse partial response filter (IPR) 142 according to the current signal peak-to-average ratio. In one embodiment, if the signal peak-to-average ratio is higher than a predetermined value or a predetermined range, the signal peak-to-average ratio is lowered to a predetermined value, lowered by a predetermined value or a predetermined range. On the contrary, if the signal peak-to-average ratio is lower than a predetermined value or a predetermined range, the signal peak-to-average ratio is increased to a predetermined value, increased by a predetermined value or a predetermined range. Therefore, while the noise interference varies, the communication device 400 according to the embodiment of the invention can correspondingly increase or decrease the signal peak-to-average ratio to acquire an optimum IPR response. Thus, the balance between the noise interference elimination and the signal quality precision can be achieved.

For example, in one embodiment, during the connection initialization between the communication device and a far-end communication device, the signal peak-to-average ratio calculation circuit 401 uses a training method to calculate a plurality of signal peak-to-average ratios and dynamically adjusts the high frequency response of the inverse partial response filter (IPR) 142 according to the signal peak-to-average ratios. By this method, the communication device 400 can adjust to obtain an optimum result of the inverse partial response filter under various conditions. It should be noted that the signal peak-to-average ratio calculation circuit 401 in another embodiment can continuously or intermittently calculate and adjust the high frequency response of the inverse partial response filter (IPR) 142. In another embodiment, the circuits of the communication device 400 can be provided with a look-up table as the reference of adjusting the high frequency response.

Figure 4B:
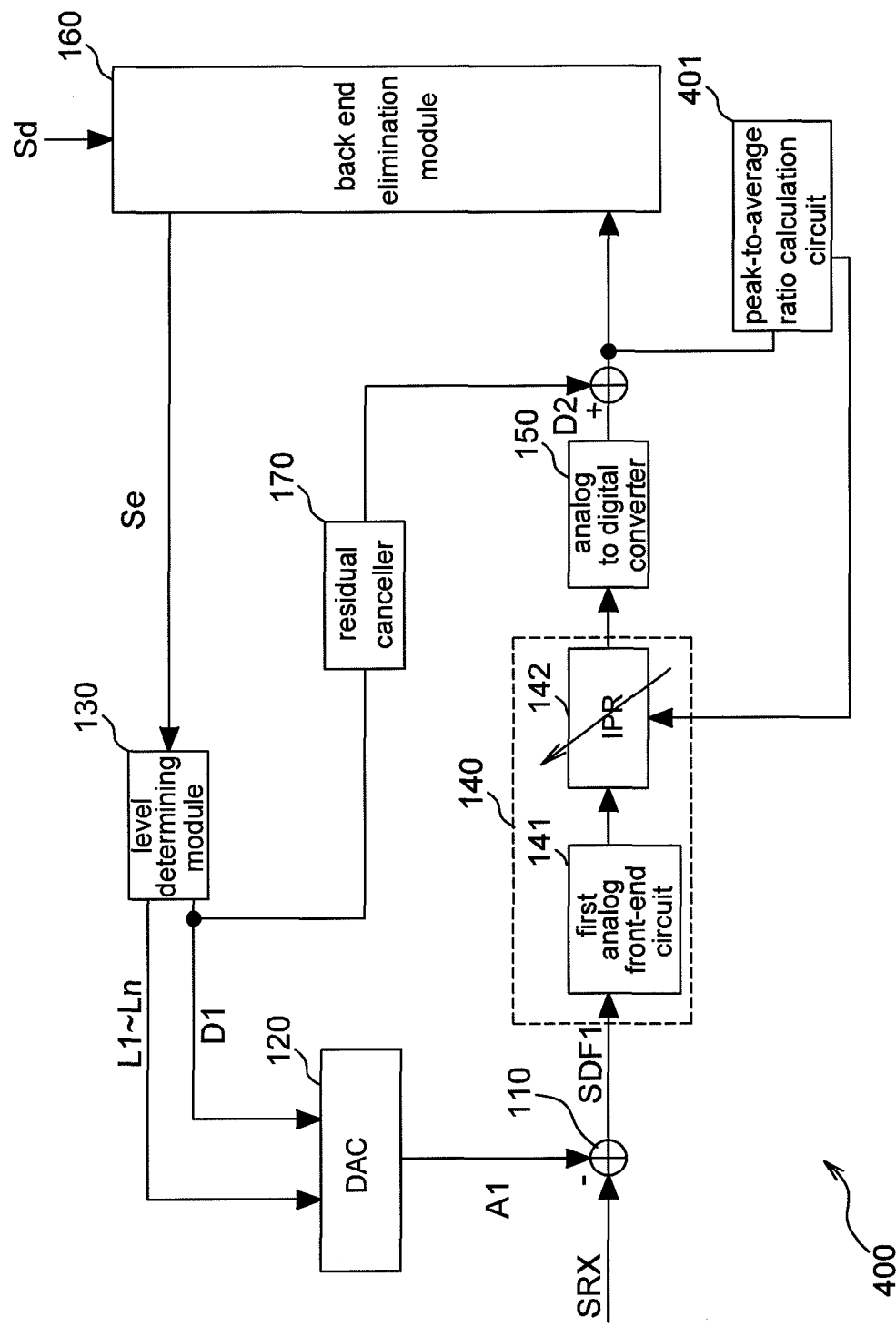
FIG. 4B shows a schematic diagram illustrating a communication device according to another embodiment of the invention.

Besides, as shown in FIG. 4B, a residual canceller 170 can be added between the calculator 110 and the back end elimination module 160 to simulate the signal response between the calculator 110 and the back end elimination module 160. The residual canceller 170 is used to simulate the signal response between the calculator 110 and the back end elimination module 160 to compensate the subtracted signal A1 in the analog process. Such mechanism can be used to compensate the error generated while the signal of the digital to analog converter (DAC) 120 is unstable or some situation occurs. In one embodiment, the residual canceller 170 can be an adaptive filter that is applicable to an adaptive algorithm. The adaptive algorithm can be one of the following algorithm or the combination thereof: least mean square (LMS) algorithm, recursive least square (RLS) algorithm, and least square (LS) algorithm.

Figure 5A:
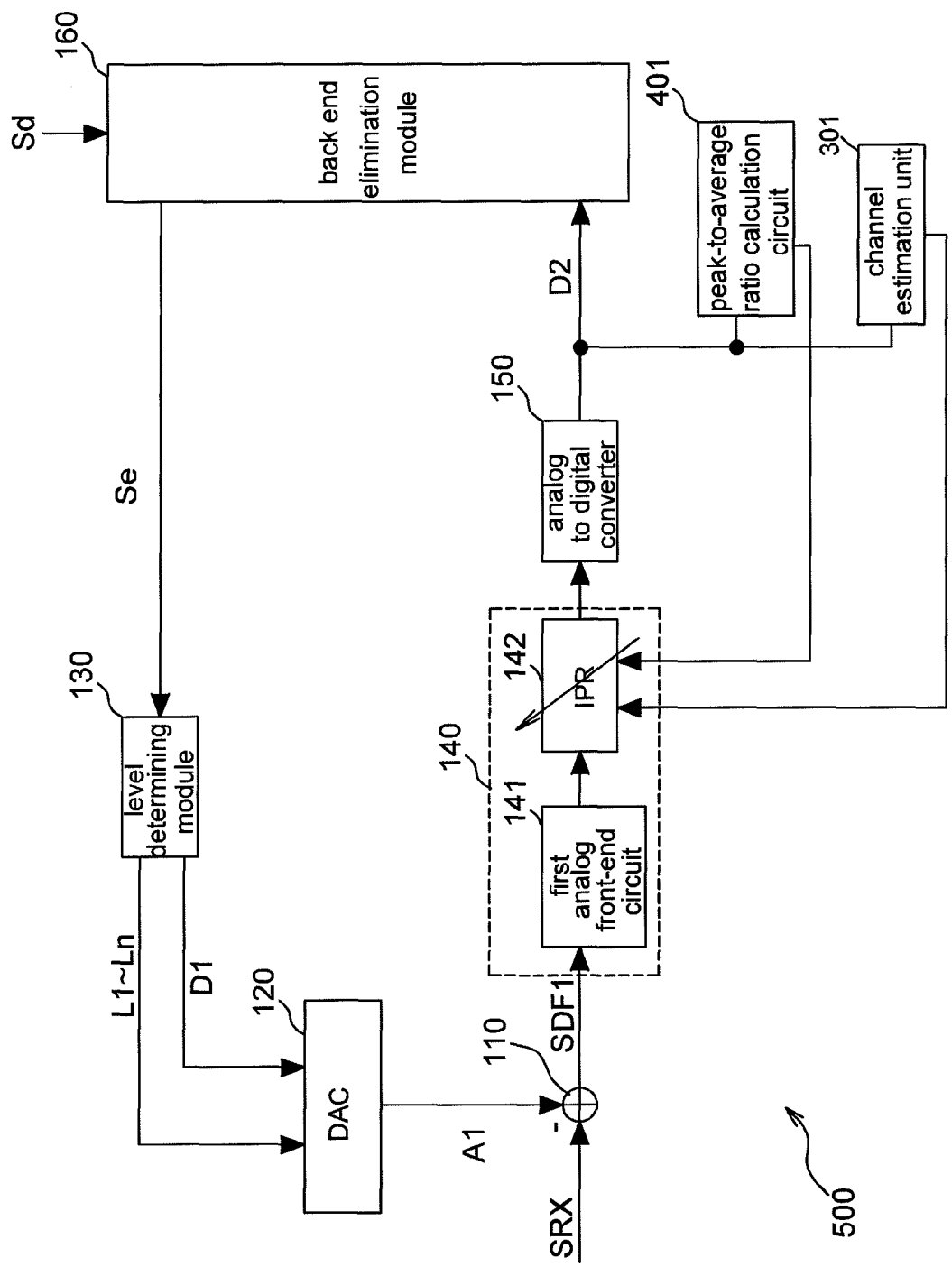
FIG. 5A shows a schematic diagram illustrating a communication device according to another embodiment of the invention.
Figure 5B:
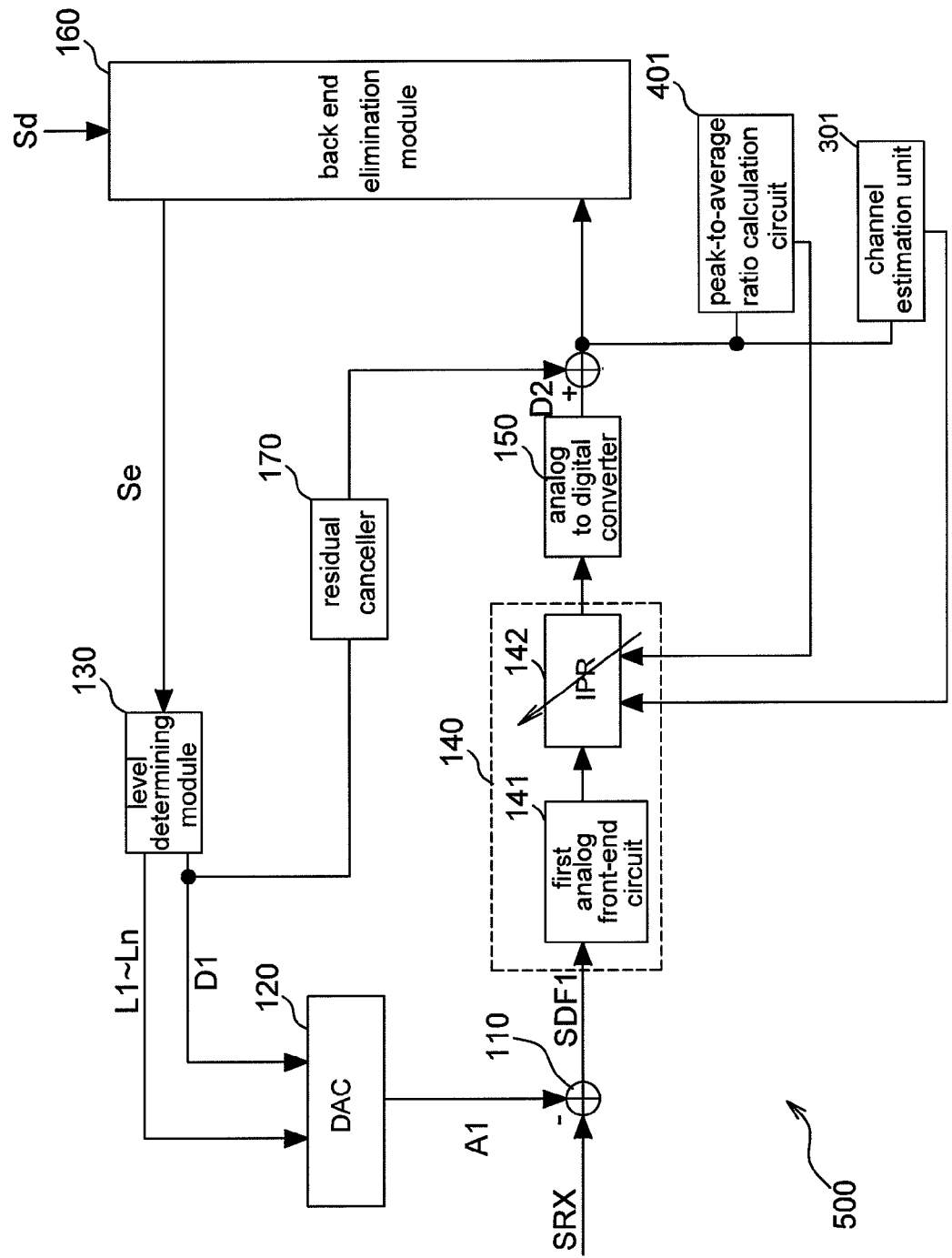
FIG. 5B shows a schematic diagram illustrating a communication device according to another embodiment of the invention.

Moreover, as shown in FIGS. 5A and 5B, the communication device 500 according to one embodiment of the invention can be simultaneously provided with the channel estimation unit 301 and the signal peak-to-average ratio calculation circuit 401 to estimate the route length and the signal peak-to-average ratio at the same time to achieve the purpose of correctly adjusting the high frequency response.

In conclusion, the communication device according to the embodiments of the invention sets the voltage levels of the signals according to the state of the receiving signal SRX in the channel to appropriately eliminate the echo and crosstalk components in the receiving signal so as to solve the problem in the prior art. The amplitude of the receiving signal SRX can be appropriately decreased and the dynamic range of the analog to digital converter can be reduced so that the design complexity and the production cost can be decreased. Besides, in the communication device according to the embodiments of the invention, before the difference signal is inputted to the analog to digital converter, the difference signal SDF1 is processed by an adjustable inverse partial response filter (IPR) that is the inverse of the partial response filter of the transmitter of the far-end receiving/transmitting device. According the channel state of the receiving signal, the peak-to-average ratio of a signal is appropriately adjusted before the signal enters the analog to digital converter to reduce the effect of quantization noise and increase the signal to noise ratio (SNR) so that the subsequent signal processing can be converged to an optimum condition to increase the performance and stability of the system.

It should be noted that in one embodiment, if the analog front-end device is provided before the calculator, the output interference response of the above mentioned analog to digital converter is substantially the same as the input interference response of the analog to digital converter.

Although the present invention has been fully described by the above embodiments, the embodiments should not constitute the limitation of the scope of the invention. Various modifications or changes can be made by those who are skilled in the art without deviating from the spirit of the invention. For example, while the communication device is turned on or after the communication device executes for a predetermined period of time, the pulse of the digital to analog (DA) converter and the sampling clock of the analog to digital (AD) converter are to be calibrated based on "the principle of having the pulse duration of the pulse-shaped analog signal be shorter than one sampling period of the analog to digital (AD) converter" or "the principle of sampling the maximum amplitude of the pulse at each time point". Or, some other analog front-end circuit is provided after the inverse partial response filter to perform various processes preset by a designer.

What is claimed is:

1. A communication device, comprising:
   a digital to analog converter, for receiving a first digital signal and converting the first digital signal into a pulse-shaped analog signal according to a plurality of voltage levels and voltage intensity thereof;
   an inverse partial response filtering circuit, for receiving a difference signal, which is the result of subtracting the pulse-shaped analog signal from a receiving signal, and adjusting a response of the inverse partial response filtering circuit according to the channel state of the receiving signal to generate an adjusted signal; and
   an analog to digital converter, for receiving the adjusted signal and converting the adjusted signal to generate a second digital signal;
   wherein the pulse-shaped analog signal is related to the echo and crosstalk noise components in the receiving signal.

2. The communication device according to claim 1, further comprising:
   a level determining module, for receiving an estimating signal and generating the plurality of voltage levels and voltage intensity thereof according to the estimating signal to generate the first digital signal.

3. The communication device according to claim 2, further comprising:
   a back end elimination module, for generating the estimating signal according to a desired signal and the second digital signal, wherein the estimating signal is related to an estimated value of the echo and crosstalk noise components in the receiving signal.

4. The communication device according to claim 1, wherein the inverse partial response filtering circuit receives a related reference signal comprising information on the channel state of the receiving signal to execute the adjusting operation on the response.

5. The communication device according to claim 1, wherein the channel state comprises at least one of the following information: signal quality, signal peak-to-average ratio, signal channel length, and channel physical route quality.

6. The communication device according to claim 1, further comprising:
   a channel estimation unit, for estimating the channel state of the receiving signal according to the second digital signal and then generating an estimating signal to adjust high-frequency response of the inverse partial response filtering circuit.

7. The communication device according to claim 6, wherein the inverse partial response filtering circuit increases the signal peak-to-average ratio of the receiving signal to a first predetermined value while the channel physical route of the receiving signal estimated by the channel estimation unit is larger than a second predetermined value; and the inverse partial response filtering circuit decreases the signal peak-to-average ratio to a third predetermined value while the channel physical route of the receiving signal estimated by the channel estimation unit is smaller than a fourth predetermined value.

8. The communication device according to claim 1, further comprising:
   a signal peak-to-average ratio calculation circuit, for receiving the second digital signal, calculating the signal peak-to-average ratio of the receiving signal according to the second digital signal, and transmitting the signal peak-to-average ratio to the inverse partial response filtering circuit for dynamically adjusting the response of the inverse partial response filtering circuit.

9. The communication device according to claim 8, wherein the inverse partial response filtering circuit decreases the signal peak-to-average ratio to a first predetermined value while the signal peak-to-average ratio calculated by the signal peak-to-average ratio calculation circuit is larger than a second predetermined value; and the inverse partial response filtering circuit increases the signal peak-to-average ratio to a third predetermined value while the signal peak-to-average ratio calculated by the signal peak-to-average ratio calculation circuit is smaller than a fourth predetermined value.

10. The communication device according to claim 8, wherein the signal peak-to-average ratio calculation circuit uses a training method to calculate a plurality of signal peak-to-average ratios during the connection initialization between the communication device and a far-end communication device and dynamically adjusts the inverse partial response filtering circuit according to the signal peak-to-average ratios.

11. The communication device according to claim 1, wherein the inverse partial response filtering circuit continuously or intermittently adjusts the response of the inverse partial response filtering circuit according to the channel state of the receiving signal, while the communication device is turned on or in operation.

12. The communication device according to claim 1, wherein the pulse duration of the pulse-shaped analog signal is shorter than one sampling period of the analog to digital (AD) converter.

13. The communication device according to claim 1, wherein the analog to digital (AD) converter samples the maximum amplitude of the pulse at each time point.

14. The communication device according to claim 1, wherein the analog to digital (AD) converter has a conditional sampling equation on the pulse-shaped analog signal: $G(Pu, AFE)<1T$, where G represents convolution, Pu represents the pulse, AFE represents input interference response before the analog to digital (AD) converter, and 1T represents one time sampling duration.

15. The communication device according to claim 1, further comprising:
   a residual canceller, for simulating the signal response between the difference signal and the second digital signal to compensate the pulse-shaped analog signal that is subtracted during the analog process.

16. A receiving method, having echo and crosstalk eliminated, the method comprising:
   determining a plurality of voltage levels and voltage intensity thereof according to an estimating signal;
   generating a first digital signal according to the plurality of voltage levels and the estimating signal;
   converting the first digital signal into a pulse-shaped analog signal according to the plurality of voltage levels and voltage intensity thereof;
   receiving a receiving signal;
   generating a difference signal by subtracting the pulse-shaped analog signal from the receiving signal;
   adjusting the peak-to-average ratio of the difference signal according to the channel state of the receiving signal;
   converting the adjusted difference signal into a second digital signal; and
   generating the estimating signal according to an output interference response of an analog to digital (AD) converter and the second digital signal, wherein the output interference response is the same as a input interference response.

17. The method according to claim 16, wherein the input interference response is the input interference response of an analog front-end circuit and the analog front-end circuit is coupled to the analog to digital (AD) converter.

18. The method according to claim 16, wherein the pulse duration of the pulse-shaped analog signal is shorter than one sampling period of the analog to digital (AD) converter.

19. The method according to claim 16, wherein the analog to digital (AD) converter samples the maximum amplitude of the pulse at each time point.

20. The method according to claim 16, wherein the channel state comprises one of the following information or the combination thereof: signal quality, signal peak-to-average ratio, signal channel length, and channel physical route quality.

* * * * *